United States Patent
Pätz et al.

(10) Patent No.: US 6,867,893 B2
(45) Date of Patent: Mar. 15, 2005

(54) PROCESS FOR PRODUCING A TRANSPARENT PANE STRUCTURE FOR MOTOR VEHICLES AND A TRANSPARENT PANE STRUCTURE

(75) Inventors: Werner Pätz, Hofstetten (DE); Helmut Teschner, Finning (DE)

(73) Assignee: Webasto Systemkomponenten GmbH & Co. KG, Stockdorf (DE)

( * ) Notice: Subject to any disclaimer, the term of this patent is extended or adjusted under 35 U.S.C. 154(b) by 0 days.

(21) Appl. No.: 10/291,816

(22) Filed: Nov. 12, 2002

(65) Prior Publication Data
US 2003/0129416 A1 Jul. 10, 2003

(30) Foreign Application Priority Data
Nov. 12, 2001 (DE) .......................................... 101 55 168

(51) Int. Cl.[7] .................................................. G02F 1/15
(52) U.S. Cl. ........................ 359/265; 359/273; 359/274; 359/275; 428/423.7; 428/425.6; 428/436; 428/437
(58) Field of Search ................................. 359/265, 273, 359/274, 275; 428/423.7, 425.6, 436, 437

(56) References Cited

U.S. PATENT DOCUMENTS

| 4,664,934 A | 5/1987 | Ito et al. |
| 6,175,441 B1 | 1/2001 | Heuer et al. |

FOREIGN PATENT DOCUMENTS

| DE | 196 30 813 A1 | 3/1997 |
| DE | 196 30 812 A1 | 2/1998 |
| DE | 198 34 834 A1 | 2/2000 |
| DE | 198 49 838 C1 | 2/2000 |
| DE | 696 04 500 T2 | 5/2000 |
| EP | 0 961 157 A2 | 12/1999 |
| EP | 0 961 158 A2 | 12/1999 |
| WO | WO 00/20528 | 4/2000 |

Primary Examiner—D. S. Nakarani
(74) Attorney, Agent, or Firm—Nixon Peabody LLP; David S. Safran

(57) ABSTRACT

A process is provided for producing a transparent pane structure for motor vehicles, especially a transparent cover for motor vehicle roofs, in which under an outside pane there is a multilayer electrochrome element for influencing the transparency of the pane structure. In the process, the inside of the outer pane is coated with a complete, functional electrochrome package. Furthermore, a transparent pane structure produced using this process is provided.

2 Claims, 1 Drawing Sheet

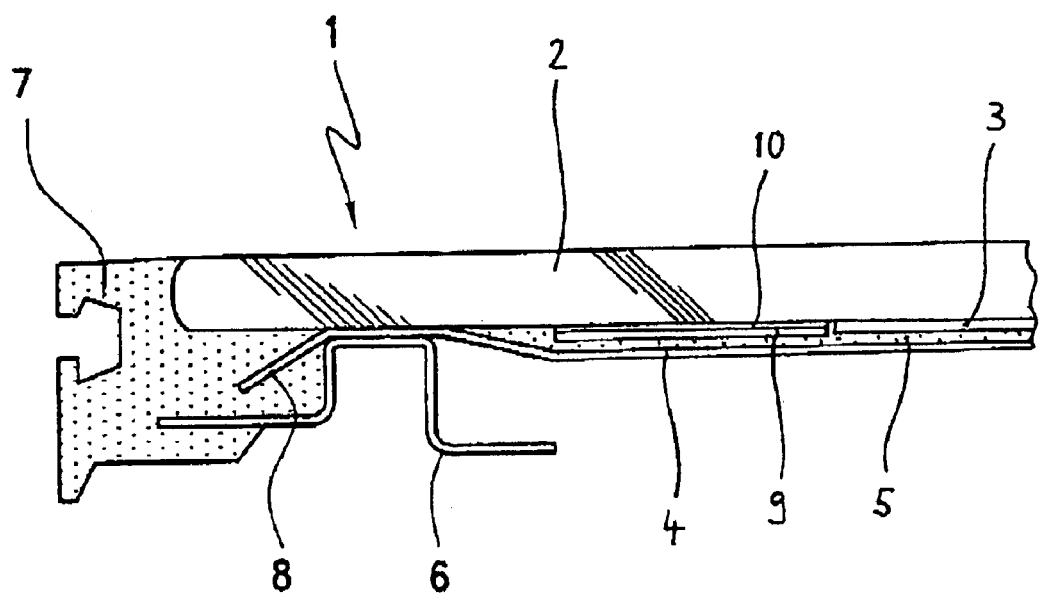

PROCESS FOR PRODUCING A TRANSPARENT PANE STRUCTURE FOR MOTOR VEHICLES AND A TRANSPARENT PANE STRUCTURE

BACKGROUND OF THE INVENTION

1. Field of the Invention

The invention relates to a process for producing a transparent pane structure for motor vehicles. The invention is particularly directed to a transparent cover for motor vehicle roofs in which a multilayer electrochrome element for influencing the transparency of the pane structure is under an outside pane.

2. Description of Related Art

German Patent Publication 196 39 813 A1 discloses a known process in which, for purposes of forming the electrochrome element, the inside of an arched outside pane of single-pane safety glass and the outside of a correspondingly arched inner pane of plastic are each coated with a transparent electrode layer and then each coated with a redox layer. The two panes are then joined together. In the connection process, the ion storage of the electrochrome element is inserted. One such procedure makes it necessary for the two panes to have the high surface cleanliness which is necessary for coating. In practice, this means that clean room conditions must prevail in production.

SUMMARY OF THE INVENTION

Accordingly, one object of the present invention is to provide a process which is simplified compared to the conventional processes for producing a transparent pane structure with an electrochrome element and for providing a pane structure resulting therefrom.

The above object, and other objects, of the present invention are achieved by providing a process wherein the inside of the outer pane is coated with a complete, functional electrochrome package, i.e. a package including transparent electrode layers, redox layers, and a transparent electrolyte.

This process of the present invention results in, and the transparent pane structure of the present invention includes, a single pane, preferably a thermally prestressed pane, in contrast to the known twin-pane structure. For this reason, special glass manufacture with the corresponding additional tool costs is not necessary. Coating processes take place only on a flat component. Only for this one flat component is it accordingly necessary for the high surface cleanliness, required for coating, to be made available. As a result, the transparent pane structure of the present invention can be produced more economically.

BRIEF DESCRIPTION OF THE DRAWINGS

The FIGURE is a partial cross-sectional side view of the edge area of the pane structure of the present invention.

DETAILED DESCRIPTION OF THE INVENTION

The entire surface of a pane structure is often not intended for viewing. Often, for example, only a larger central area is intended for viewing. This is especially the case for transparent covers for motor vehicle roofs. Preferably, in these cases, only the area of the pane structure which is intended for viewing is coated with an electrochrome package.

At least some of the layers which form the electrochrome package can be built up on the inside of the outer pane by a sputtering process. The outer pane can advantageously be a glass pane which is thermally prestressed, i.e. a so-called single-pane safety glass with its proven safety properties. After application, the electrochrome layers are not subjected to further temperature treatment in this case, which could change the prestressing properties of the single-pane safety glass. The thickness structure of the transparent pane structure can advantageously correspond essentially to that of conventional single pane safety glass constructions for covers of motor vehicle roofs.

To protect against damage from the interior of the vehicle, preferably at least the area of the pane structure intended for viewing is covered on the inside with a transparent plastic film after coating with the electrochrome package. The plastic film can feasibly be a film of polyethylene terephthalate (PET) or polyester which has been coated to be scratch-proof. The PET film or the polyester film can feasibly be laminated on with polyvinylbutyral (PVB), aliphatic polyurethane or other transparent adhesive films. But an overall film package can also be used, as is marketed for example by DuPont under the trade name "Spallshield"® and by Minnesota Mining and Manufacturing Company (3M) under the trade name "Scotchshield"®. "Spallshield"® is a composite of polyvinylbutyral (PVB) and polyester or polyethylene terephthalate films which is provided with a scratchproof coating. "Scotchshield"® are thin, tough and tear-resistant polyester films with impact-proof adhesive system.

In another embodiment of the invention, on the inside of the outer pane, outside the area of the pane structure intended for viewing, there can be solar cells. These solar cells, as explained in German Patent Publication 196 30 813 A1, can be used for power supply of the pane structure and/or of the motor vehicle battery or of the vehicle electrical system, and the voltage delivered by the solar cells can be chosen or selected such that automatic matching of the light transparency of the electrochrome element takes place based on the incident solar radiation.

The solar cells can be applied especially as thin film solar cells by coating processes to the inside of the outer pane or can be inserted when the protective plastic film is laminated on as crystalline cells between the inside of the outer pane and the outer side, that is, the opposing side, of the plastic film.

Electrochrome elements are known and therefore are not detailed here. For example, among others, elements of the type described in German Patent Publication 196 30 813 A1 are suitable, i.e. elements with transparent electrodes of indium-tin oxide (ITO) and redox layers with a reductively dyeing material such as $WO_3$, $MoO_3$, $Nb_2O_5$, $V_2O_5$ or $TiO_2$ and/or with an oxidatively dyeing material, such as $NiO_x$, $IrO_x$, $CoO_x$, polyaniline, polypyrrol or polythiophene.

The present invention is detailed below using one embodiment of the transparent pane structure of the present invention with reference to the FIGURE which shows a cross section through the edge area of the pane structure. The pane structure is, for example, a cover 1 of a motor vehicle roof which contains an outer glass pane 2 of single-pane safety glass which is thermally prestressed. The glass pane 2 is coated on its bottom or inside surface, in the area provided for looking through the glass pane 2, with electrochrome layers 3 which form an electrochrome package. On the inside of the glass pane 2 outside the area of the pane structure intended for viewing, crystalline solar cells 9 are fixed to the glass pane 2 by means of an adhesive layer or adhesive film 10. Alternatively, the solar cells can be applied to the glass pane 2 as thin film solar cells by coating processes. In this case the adhesive film 10 shown in the Figure will not be used. To protect against damage from the interior of the motor vehicle furthermore a transparent plastic film 4 as the cover film, for example PET film, is applied to the electrochrome layers 3 or the electrochrome package by means of a transparent adhesive film 5, for example, an adhesive film of polyurethane. An inside cover sheet 6, which is located on the edge side and which the bearing or guide means for the cover 1 can engage or to which it can be attached, is attached by means of peripheral foaming 7, for example, of polyurethane. The edge strip 8 of the plastic film 4 is foamed in the peripheral foam 7.

The transparent plastic film 4 forms a barrier for water vapour and protects the electrochrome layers 3 and the solar cells 9 and their electrical connections as ti continuously covers both. The edge strip 8 of the plastic film 4 being foamed in the peripheral foam 7 prevents moisture or water vapour from entering peripherally under the film 4.

We claim:

1. A transparent pane structure for motor vehicles, comprising:
   a pane having an inside surface;
   a complete multilayer electrochrome package mounted on the inside surface of the pane for influencing the transparency of the pane structure;
   wherein a transparent plastic cover film is positioned on the electronic package in at least an area of the pane structure which is intended for viewing;
   wherein crystalline solar cells are positioned on the inside of the pane outside an area of the pane structure which is intended for viewing; and
   wherein the pane is a prestressed single-pane safety glass.

2. The pane structure of claim 1, wherein the transparent plastic cover film is laminated on by a transparent adhesive film.

* * * * *